US007944837B2

(12) United States Patent
Ma

(10) Patent No.: US 7,944,837 B2
(45) Date of Patent: May 17, 2011

(54) METHOD AND SYSTEM FOR CONTROLLING DATA FLOW

(75) Inventor: Guozhen Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 12/211,505

(22) Filed: Sep. 16, 2008

(65) Prior Publication Data

US 2009/0010167 A1    Jan. 8, 2009

Related U.S. Application Data

(63) Continuation of application No. PCT/CN2006/003325, filed on Dec. 7, 2006.

(30) Foreign Application Priority Data

Apr. 12, 2006 (CN) .......................... 2006 1 0035035

(51) Int. Cl.
*H04L 12/56* (2006.01)
*H04L 12/28* (2006.01)
*G06F 9/26* (2006.01)

(52) U.S. Cl. .................... 370/235; 370/392; 370/395.32; 711/216

(58) Field of Classification Search .................. 370/235, 370/252, 254, 395.32, 395.52, 392; 711/216–221
See application file for complete search history.

(56) References Cited

U.S. PATENT DOCUMENTS

| | | | | |
|---|---|---|---|---|
| 6,735,670 B1 * | 5/2004 | Bronstein et al. | ............. | 711/108 |
| 6,775,281 B1 * | 8/2004 | Brown | ........................... | 370/392 |
| 7,088,718 B1 * | 8/2006 | Srivastava | .................... | 370/392 |
| 7,130,305 B2 * | 10/2006 | Kuukankorpi et al. | ....... | 370/392 |
| 7,525,969 B2 * | 4/2009 | Grant | ............................. | 370/392 |
| 7,529,251 B2 * | 5/2009 | Oku et al. | ................ | 370/395.32 |
| 2002/0097724 A1 | 7/2002 | Halme et al. | | |
| 2003/0063611 A1 | 4/2003 | Schaub et al. | | |
| 2003/0081615 A1 * | 5/2003 | Kohn et al. | ............. | 370/395.42 |

(Continued)

FOREIGN PATENT DOCUMENTS

| | | |
|---|---|---|
| CN | 1414737 A | 4/2003 |
| WO | 2004/088918 A2 | 10/2004 |

OTHER PUBLICATIONS

Cheng Guang, et al.; "A Hash Algorithm for IP Flow Measurement"; Journal of Software; May 2005; vol. 16, No. 5; pp. 652-658; with English Abstract thereof.

(Continued)

*Primary Examiner* — Kwang B Yao
*Assistant Examiner* — Candal Elpenord

(57) ABSTRACT

A method and system for controlling data flow are provided. The method includes: selecting optional reference data of a flow algorithm to generate configuration information; and performing traffic calculation based on the configuration information to determine hash distribution of the data flow to load balancing links. The flow algorithm is a HASH algorithm. The system includes: a selecting configuring unit, for selecting corresponding reference data according to the optional reference data for the flow algorithm; a controlling information processing unit, for generating a corresponding controlling parameter according to the selected reference data; a forwarding table interface unit, for generating configuration information according to the generated controlling parameter and storing the information in a corresponding forwarding table; a forwarding controlling unit, for completing the traffic calculation according to the configuration information in the forwarding table and determining the hash of the data flow on the load balancing link.

2 Claims, 5 Drawing Sheets

U.S. PATENT DOCUMENTS

2003/0223424 A1* 12/2003 Anderson et al. ............. 370/392
2006/0171316 A1    8/2006 El-Sakkout et al.
2006/0221977 A1* 10/2006 Basso et al. ............. 370/395.32

OTHER PUBLICATIONS

International Search Report for International Application No. PCT/CN2006/003325, dated Mar. 29, 2007, and English-translation thereof.

Ju-Yeon Jo, et al.; "Hash-based Internet Traffic Load Balancing"; Information Reuse and Integration, 2004; IRI 2004; Proceedings of the 2004 IEEE International Conference on Las Vegas, NV, USA; Nov. 8-10, 2004; Piscataway, NJ, USA; IEEE; Nov. 8, 2004; pp. 204-209; XP010798675; ISBN: 978-0-7803-8819-2.

European Search Report for European Patent Application No. 06828270.6, dated Sep. 14, 2009.

* cited by examiner

METHOD AND SYSTEM FOR CONTROLLING DATA FLOW

CROSS-REFERENCE TO RELATED APPLICATIONS

This application is a continuation of International Application No. PCT/CN2006/003325, filed Dec. 7, 2006. This application claims the benefit and priority of Chinese Application No. 200610035035.4, filed Apr. 12, 2006. The entire disclosures of each of the above applications are incorporated herein by reference.

FIELD

The present disclosure relates to a communication technology and to a method and system for controlling data flow.

BACKGROUND

This section provides background information related to the present disclosure which is not necessarily prior art.

In a network, two or more equivalent links exist from a certain node to a destination, which requires a uniform distribution of data flow on the links according to a certain rule during forwarding. A HASH algorithm is usually adopted. This algorithm makes all circumstances occur as evenly as possible by a hash method. Besides, in most cases, the flow needs to be transmitted in order, so as to avoid disorder.

For example, in a router, every forwarding protocol and service employs a corresponding fixed HASH algorithm, so that a load balancing effect is achieved on the equivalent links and the flow is uniformly hashed on every link. A controlling plane transfers various types of information therein to a forwarding table. A forwarding plane completes a traffic calculation and relevant data forwarding according to the forwarding table.

In order to make the distribution of the flow as uniform as possible, every service selects an optimal HASH source to perform a hash. The HASH source is a value for performing the HASH calculation. However, different providers and customers may require the flow to be distributed on the equivalent links according to different rules.

FIG. 1 is a schematic view illustrating a connection of multiple links of a PWE3 network in the prior art. The PWE3 network includes customer edges CE1, CE2 and provider edge routers PE1, PE2. The PWE3 network provides a tunnel on a packet switched network to emulate the Layer 2 VPN protocol of some services. The conventional network and the packet switched network may be interconnected through this protocol to realize the resource sharing and network expansion. As shown in the figure, a flow is on PE1. Multiple equivalent links (i.e., pseudo wires PW1, PW2, . . . ) of a Multiprotocol Label Switching (MPLS) tunnel are connected to PE2. At this time, the flow must select one of the links for transmission. The hash can be performed in the following three manners.

1) The HASH is performed according to IP addresses and the flow with the same source IP and destination IP is on the same link.

2) The HASH is performed according to virtual circuit labels (VC_LABELs) and the flow of the same link PW is on the same link.

3) The HASH is performed according to physical addresses MACs of Ethernet devices and the flow with the same Layer 2 address is on the same link.

In the router, the flow algorithm is fixed, so that only one of the load balancing methods can be used. The above three algorithms have different emphases on balance of load, and thus generate different degrees and effects of flow uniformity. Moreover, different customers may have varied requirements of the distribution of the flow on an intermediate node of the PE. Thereby, the prior art fails to meet the requirements from different customers of the transmission of the flow on the load balancing link.

SUMMARY

This section provides a general summary of the disclosure, and is not a comprehensive disclosure of its full scope or all of its features.

Through embodiments, the present disclosure is directed to a method and system for controlling data flow, so as to solve the problem in the prior art that the data flow cannot be distributed on a load balancing link upon requirements.

In an embodiment of the present disclosure, a method for controlling data flow is provided. The method includes the following blocks.

selecting reference data according to optional reference data for a flow algorithm, generating configuration information; and performing traffic calculation based on the configuration information to determine hash distribution of the data flow to load balancing links.

Further, in another embodiment of the present disclosure, a system for controlling data flow including a selecting configuring unit 4, a controlling information processing unit, a forwarding table interface unit, and a forwarding controlling unit is provided.

The selecting configuring unit 4 is adapted to select reference data according to optional reference data for a flow algorithm;

The controlling information processing unit, in communication with the selecting configuring unit, adapted to generate a corresponding configuration parameter according to the selected reference data;

The forwarding table interface unit, in communication with the controlling information processing unit, adapted to generate configuration information according to the generated configuration parameter and store the configuration information in a corresponding forwarding table; and The forwarding controlling unit, in communication with the forwarding table interface unit, adapted to complete traffic calculation according to the configuration information in the forwarding table and determine hash distribution of the data flow to load balancing links.

Seen from the above technical schemes, in the embodiments of the present disclosure, the configuration information is generated by configuring the reference data of the flow algorithm. Then, the traffic calculation is performed by the flow algorithm according to the configuration information so as to determine the hash distribution of the data flow to the load balancing links. In this manner, the customer may select the flow algorithm upon demands by configuring the reference data of the flow algorithm, so as to meet the distribution requirements of the data flow on the load balancing link. Taking the HASH algorithm for example, the flow algorithm is selected by choosing different HASH sources. Therefore, the above technical schemes can flexibly configure the flow algorithm upon actual requirements, thus overcoming the defect that the prior art fails to meet the requirements from different customers of the transmission of the flow on the load balancing link.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure will become more fully understood from the detailed description given herein below for illustration only, and thus are not limitative of the present disclosure, and wherein.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 2:
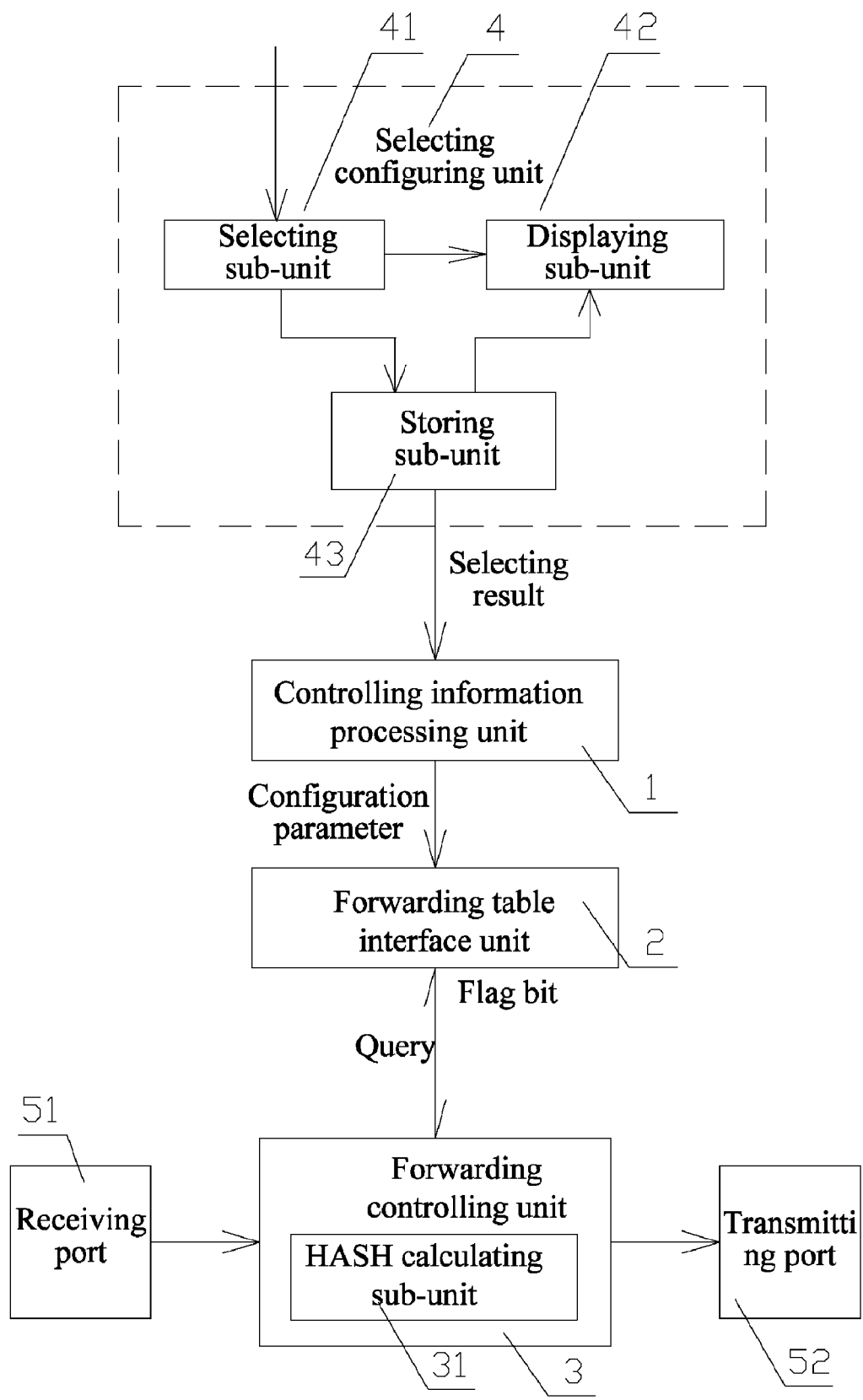
FIG. 2 is a simplified schematic structural diagram of a system for controlling data flow according to an embodiment.

FIG. 2 is a schematic structural view of a system for controlling data flow according to an embodiment. The system includes a controlling information processing unit 1, a forwarding table interface unit 2, a forwarding controlling unit 3, and a selecting configuring unit 4. The selecting configuring unit 4 is adapted to store optional reference data of a flow algorithm, obtain a selecting result, and send the selecting result to the controlling information processing unit 1. Specifically, the selecting configuring unit 4 includes a selecting sub-unit 41, a displaying sub-unit 42, and a storing sub-unit 43. The selecting sub-unit 41 is adapted to receive the selecting information and send operating instructions to the displaying sub-unit 42 and the storing sub-unit 43. The displaying sub-unit 42 is adapted to display options and selecting manners of a reference data according to the operating instructions of the selecting sub-unit 41. The storing sub-unit 43 is adapted to store the reference data of the flow algorithm and the selecting result, and store, update, or call the data therein according to the operating instructions of the selecting sub-unit 41.

As shown in FIG. 2, the controlling information processing unit 1 communicates with the storing sub-unit 43, for generating a corresponding parameter according to various types of information in a controlling plane and sending the information to the forwarding table interface unit 2. That is, the controlling information processing unit 1 generates a corresponding configuration parameter according to the selecting result from the storing sub-unit 43, and sends the configuration parameter to the forwarding table interface unit 2.

In FIG. 2, the forwarding table interface unit 2 generates configuration information in a forwarding table according to the configuring parameter, and refreshes and stores the forwarding table. A HASH source type flag bit is set in this forwarding table. For a general data table processing, such flag bit may be embodied in a corresponding HASH source type flag bit field added in the forwarding table.

Again referring to FIG. 2, the forwarding controlling unit 3 completes the flow calculation according to the forwarding table, and determines a hash of the data flow on a load balancing link. In the embodiment of the present disclosure, the forwarding controlling unit 3 includes a HASH calculating sub-unit 31 for completing the HASH flow calculation, and obtains a HASH source type according to the flag bit in the forwarding table.

In the system according to the embodiment of the present disclosure, the controlling information processing unit 1 and the selecting configuring unit 4 are on a controlling plane, the forwarding controlling unit 3 is on a forwarding plane, and the forwarding table interface unit 2 is between the controlling plane and the forwarding plane. As shown in FIG. 2, data flow is transmitted from a receiving port 51 to the forwarding controlling unit 3. Then, the forwarding controlling unit 3 determines the distribution on the load balancing link through the HASH traffic calculation. Afterward, the data flow is transmitted out via a transmitting port 52. A PWE3 network is taken as an example for illustration in the embodiment of the present disclosure.

Figure 1:
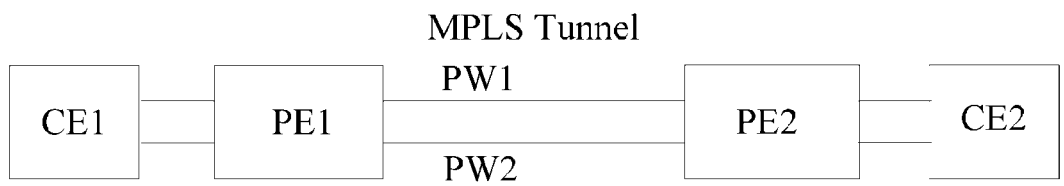
FIG. 1 is a schematic view illustrating a connection of multiple links of a PWE3 network in the prior art.
Figure 3:
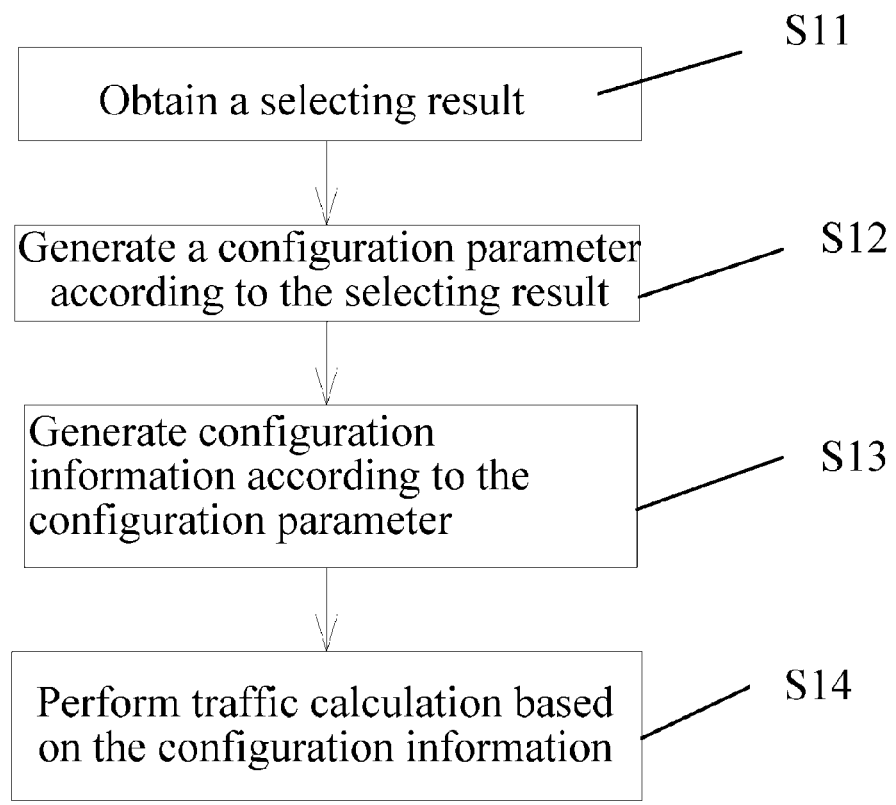
FIG. 3 is a simplified schematic diagram illustrating a flowchart of a method for controlling data flow according to an embodiment.

Referring to FIG. 2 and FIG. 3 together, FIG. 3 is a simplified flowchart of a method for controlling data flow according to an embodiment of the present disclosure. The method includes the following blocks.

A. Generating configuration information according to reference data of configured flow B. Performing traffic calculating upon the configuration information, to hash data flow to load balancing links. The method is specifically implemented as follows.

In Block S11, a selecting result is obtained. That is, obtaining the selecting result, by the selecting configuring unit 4 and sending the selecting result to the controlling information processing unit 1.

In Block S12, generating configuration parameter according to the selecting result. That is, generating configuration parameter according to the selecting result, by the controlling information processing unit 1, and sending the configuration parameter to the forwarding table interface unit 2.

In Block S13, generating configuration information according to the configuration parameter, that is, generating the configuration information in a forwarding table according to the configuration parameter, by the forwarding table interface unit 2.

In Block S14, performing traffic calculating for the configuration information. That is, the forwarding controlling unit 3 employs a flow algorithm to perform traffic calculating according to the configuration information in the forwarding table. The specific flow algorithm will be clear to one skilled in the art and will not be described herein again. In practice, the forwarding controlling unit 3 queries the forwarding table in the forwarding table interface unit 2 to obtain a flag bit therein, and then employs the flow algorithm to determine hash distribution of the data flow on the load balancing links.

Figure 4:
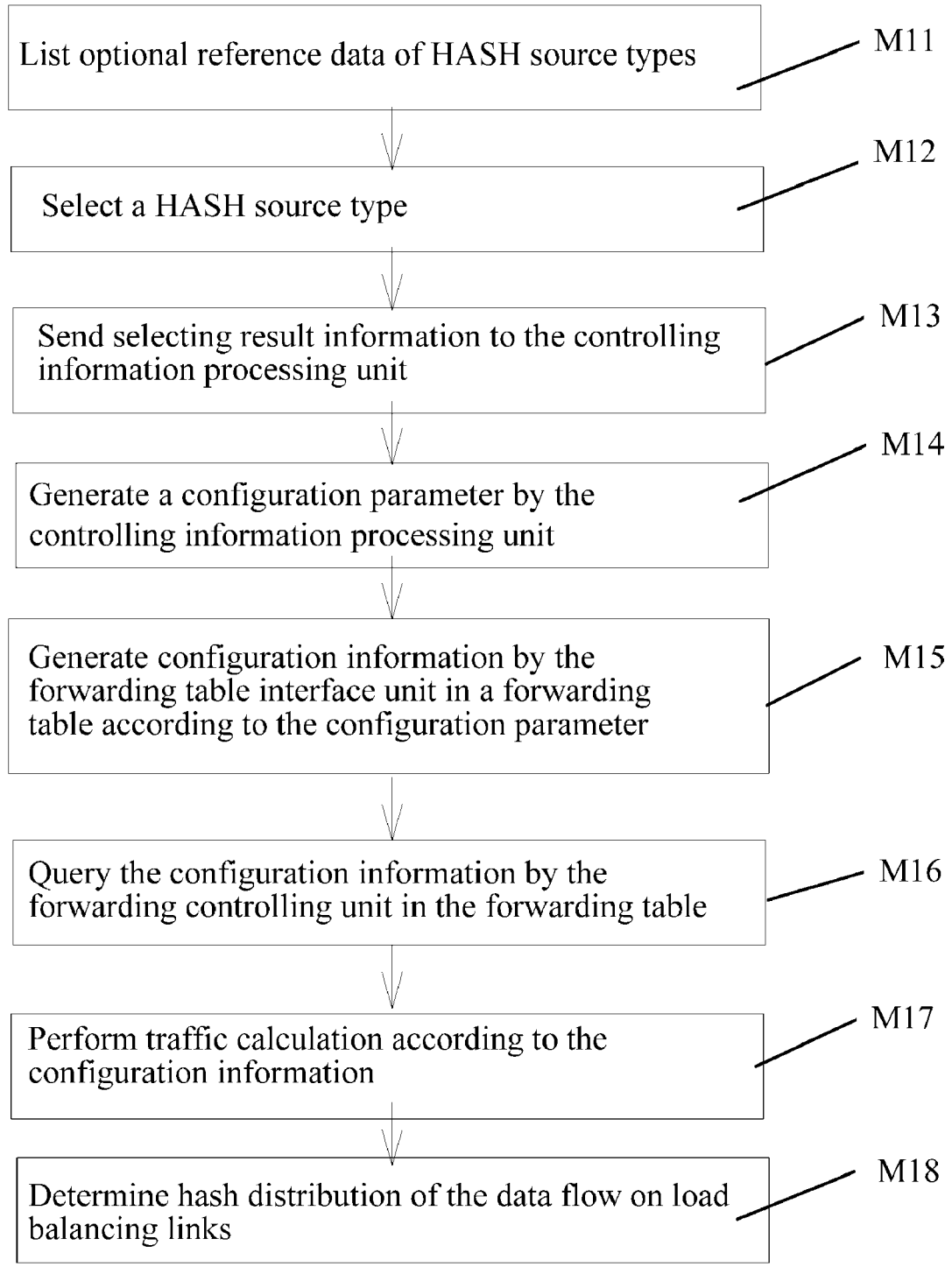
FIG. 4 is a simplified flowchart of a method for controlling data flow according to a first embodiment.

Referring to FIG. 2 and FIG. 4 together, FIG. 4 is a flowchart of a method for controlling data flow according to a first embodiment of the present disclosure. The method includes the following blocks.

In Block M11, optional reference data of HASH source types is listed. That is, the selecting configuring unit 4 is actuated. The selecting sub-unit 41 sends operating instructions to the displaying sub-unit 42 and the storing sub-unit 43, so as to call the data in the storing sub-unit 43 and display the listed optional reference data of the HASH source types through the displaying sub-unit 42. In the embodiment of the present disclosure, the optional reference data of the HASH source types includes, but not limited to, an IP address, a VPN label, an MAC address, and a packet-by-packet. The optional reference data may also be preset upon requirements.

In Block M12, a HASH source type is selected. Different options may be represented by numerals. The customer inputs an option to the selecting sub-unit 41, i.e., to choose the HASH source type by selecting one of the above HASH source types.

In Block M13, selecting result information is sent to the controlling information processing unit 1. That is, the selecting sub-unit 41 sends an operating instruction to the storing sub-unit 43, and thus the storing sub-unit 43 stores and sends the selecting result information to the controlling information processing unit 1.

In Block M14, the controlling information processing unit 1 generates a configuration parameter. That is, the controlling information processing unit 1 generates the configuration parameter according to the selecting result, and sends the configuration parameter to the forwarding table interface unit 2. In this manner, the reference data of the flow algorithm is configured through the above Blocks M11 to M14.

In Block M15, the forwarding table interface unit 2 generates configuration information in a forwarding table according to the configuration parameter, and a HASH source type flag bit is set in the forwarding table.

In Block M16, the forwarding controlling unit 3 queries the configuration information in the forwarding table, i.e., queries the HASH source type flag bit in the forwarding table to obtain the HASH source type.

In Block M17, traffic calculating is performed according to the configuration information. That is, the HASH calculating sub-unit 31 in the forwarding controlling unit 3 performs a HASH traffic calculating according to the HASH source type.

In Block M18, the forwarding controlling unit 3 determines hash distribution of the data flow on load balancing links.

Figure 5:
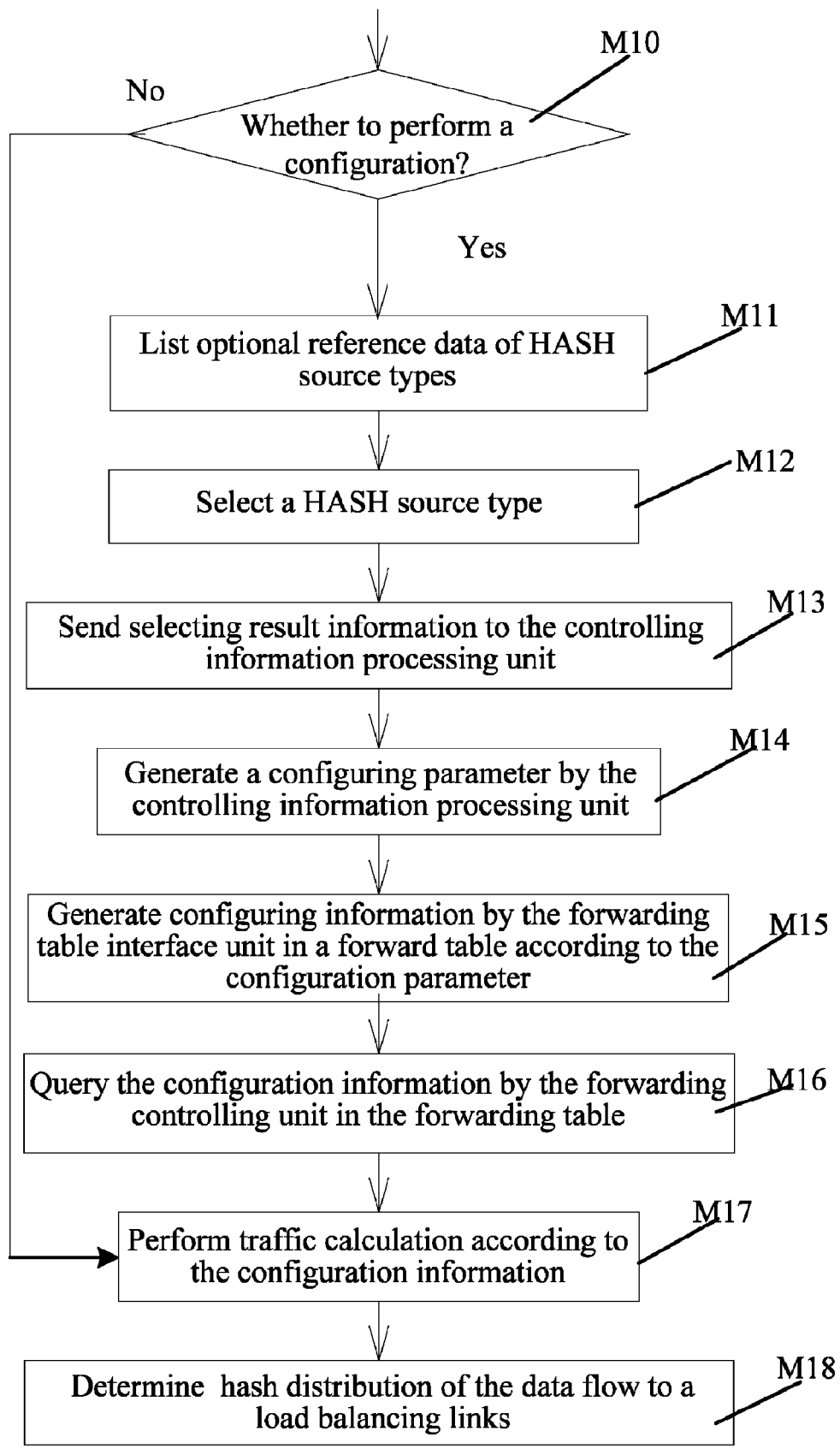
FIG. 5 is a simplified flowchart of a method for controlling data flow according to a second embodiment.

FIG. 5 is a flowchart of a method for controlling data flow according to a second embodiment of the present disclosure. The main differences between this embodiment and that of the first embodiment are as follows. In the second embodiment, first, the selecting configuring unit 4 is employed and queries whether to perform the configuration or not (i.e., Block M10). If the customer replies "yes" (i.e., "Y"), the subsequent operation is the same as or similar to the aforementioned Blocks M11 to M18. If the customer replies "no" (i.e., "N"), a default configuration is activated (Block M19). The default configuration may be set in many ways. For example, during the initialization of the system, a default HASH source type flag bit is set in the forwarding table of the forwarding controlling unit 3, or a software-controlled or hardware-fixated HASH source type is directly set in the forwarding controlling unit 3. Thereby, the configuration can be implemented in many ways without requiring any creative efforts for those skilled in the art, which will not be described herein again.

Figure 6:
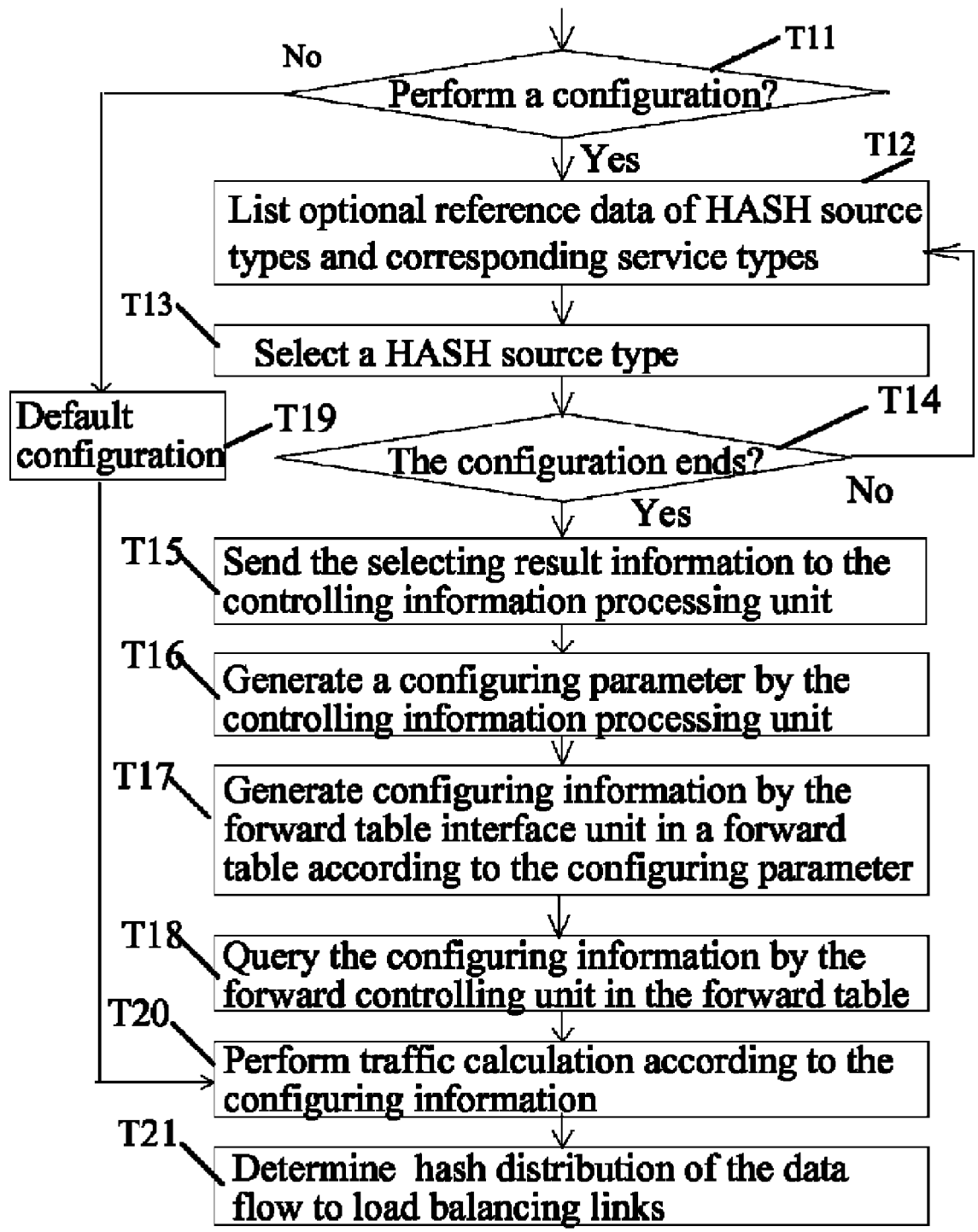
FIG. 6 is a simplified flowchart of a method for controlling data flow according to a third embodiment.

Referring to FIG. 2 and FIG. 6, FIG. 6 is a flowchart of a method for controlling data flow according to a third embodiment of the present disclosure. The method is specifically implemented as follows.

In Block T11, the selecting configuring unit 4 is actuated to query whether to perform the configuration or not. The detailed implementation is as follows.

If the customer replies "yes", the following operations are performed.

In Block T12, optional reference data of HASH source types and corresponding service types are displayed and listed through the displaying sub-unit 42.

In Block T13, a HASH source type is selected. Different options may be represented by numerals. The customer inputs an option to the selecting sub-unit 41, i.e., to choose the HASH source type by selecting one of the above HASH source types. The selecting sub-unit 41 sends an operating instruction to the storing sub-unit 43, and thus the storing sub-unit 43 stores the selecting result information.

In Block T14, the selecting configuring unit 4 queries whether the configuration ends. If the customer replies "Y", the method proceeds to the following Block T15; and if the customer replies "N", the above Blocks T12 to T13 are repeated. In this manner, different service types are corresponding to different options.

For example, for the Internet Protocol Version 4 (IPV4) type of service, corresponding options of the HASH source type include an IP address, an MAC address, and a packet-by-packet. For the MPLS tunnel type of service, corresponding options of the HASH source type include an IP address, a label of an outermost layer, a label of an innermost layer, a label of the nth layer, a packet-by-packet, and so on.

In Block T15, the storing sub-unit 43 sends the selecting result to the controlling information processing unit 1. Here, the selecting result may include HASH source types respectively corresponding to two or more service types.

In Block T16, the controlling information processing unit 1 generates a configuration parameter according to the selecting result, and sends the configuration parameter to the forwarding table interface unit 2.

In Block T17, the forwarding table interface unit 2 generates configuration information in a forwarding table according to the configuration parameter. A HASH source type flag bit is set in this forwarding table. For a plurality of service types, HASH source types corresponding to all the different service types may be set in one forwarding table, or respectively employ different forwarding tables corresponding to different services. Thereby, the configuration can be implemented in many ways without requiring any creative efforts for those skilled in the art, which will not be described herein again.

In Block T18, the forwarding controlling unit 3 queries the configuration information in the forwarding table, i.e., queries the HASH source type flag bit in the forwarding table to obtain the HASH source type. Then, the process proceeds to Block T20.

If the customer replies "N", a default configuration is activated (Block T19), and Block T20 is performed.

In Block T20, the HASH calculating sub-unit 31 in the forwarding controlling unit 3 performs a HASH traffic calculation according to the HASH source type.

In Block T21, the forwarding controlling unit 3 determines a hash of the data flow on a load balancing link.

In light of the above technical schemes, in the embodiments of the present disclosure, a selecting result is obtained through the selecting configuring unit 4, a HASH source type flag bit is set in a forwarding table, and a HASH source type is obtained according to the flag bit, so that a corresponding HASH traffic calculation is performed. Compared with the prior art, the system in the technical schemes according to the embodiments of the present disclosure costs lower upgrading cost and is easier to operate. Therefore, the embodiments of the present disclosure are highly operable and practicable.

The above embodiments are for illustration only, instead of limiting the present disclosure. Those of ordinary skill in the art can make some modifications and variations without departing from the principle of the present disclosure. Those modifications and variations also fall in the appended claims of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for controlling data flow comprising: a selecting configuring unit adapted to list optional reference data for a flow algorithm and obtain a selecting result inputted by a customer for selecting reference data from the listed optional reference data; a controlling information processing unit, in communication with the selecting configuring unit, adapted to generate a corresponding configuration parameter according to the selecting result; a forwarding table interface unit, in communication with the controlling information processing unit, adapted to generate configuration information according to the generated configuration parameter and store the configuration information in a corresponding forwarding table; and a forwarding controlling unit, in communication with the forwarding table interface unit, adapted to complete traffic calculation according to the configuration information in the forwarding table and determine hash distribution of the data flow to load balancing links; wherein the selecting configuring unit comprises: a selecting sub-unit, adapted to receive the selecting result inputted by the customer for selecting HASH source types for the flow algorithm and send corresponding operating instructions; a displaying sub-unit, in communication with the selecting sub-unit, adapted to display optional reference data of HASH source types and the selected HASH source types based on the received operating instructions; and a storing sub-unit, in communication with respectively the selecting sub-unit and the displaying sub-unit, adapted to store or update the reference data of the flow algorithm and the selecting result according to the operating instructions.

2. The system for controlling data flow according to claim 1, wherein the selecting configuring unit further comprises a determining sub-unit in communication with the selecting sub-unit adapted to determine whether the optional reference data of the flow algorithm is to be configured.

* * * * *